(12) United States Patent
Kuretake et al.

(10) Patent No.: US 7,396,790 B2
(45) Date of Patent: Jul. 8, 2008

(54) TRANSLUCENT CERAMIC, METHOD FOR MANUFACTURING THE SAME, OPTICAL COMPONENT, AND OPTICAL DEVICE

(75) Inventors: Satoshi Kuretake, Yasu (JP); Yuji Kintaka, Omihachiman (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 11/852,373

(22) Filed: Sep. 10, 2007

(65) Prior Publication Data

US 2008/0064584 A1 Mar. 13, 2008

Related U.S. Application Data

(63) Continuation of application No. PCT/JP2006/305346, filed on Mar. 17, 2006.

(30) Foreign Application Priority Data

Apr. 19, 2005 (JP) ............... 2005-120532
Apr. 27, 2005 (JP) ............... 2005-129486

(51) Int. Cl.
*C04B 35/453* (2006.01)
*C04B 35/468* (2006.01)

(52) U.S. Cl. .................. 501/135; 501/136; 501/137; 501/138; 428/701; 428/702; 264/673

(58) Field of Classification Search ................ 501/135, 501/136, 137, 138, 139; 428/701, 702; 264/673
See application file for complete search history.

(56) References Cited

U.S. PATENT DOCUMENTS

| | | | | |
|---|---|---|---|---|
| 4,752,594 A | * | 6/1988 | Hyuga et al. ............. | 501/135 |
| 6,403,053 B1 | * | 6/2002 | Fang et al. .............. | 423/594.8 |
| 6,908,872 B2 | * | 6/2005 | Tanaka et al. ............ | 501/135 |
| 7,056,852 B2 | * | 6/2006 | Tatekawa ................ | 501/135 |
| 7,294,597 B2 | * | 11/2007 | Kintaka .................. | 501/136 |
| 2003/0181311 A1 | * | 9/2003 | Tanaka et al. ............ | 501/135 |
| 2005/0104265 A1 | * | 5/2005 | Tanaka et al. ............ | 264/648 |
| 2007/0207913 A1 | * | 9/2007 | Kintaka .................. | 501/135 |

FOREIGN PATENT DOCUMENTS

| | | |
|---|---|---|
| JP | 5-127078 A | 5/1993 |
| JP | 7-244865 A | 9/1995 |
| JP | 2002-202485 A | 7/2002 |
| JP | 2004-075512 A | 3/2004 |
| JP | 2004-075516 A | 3/2004 |
| JP | 2005-075715 A | 3/2005 |
| WO | WO-02/49984 A1 | 6/2002 |

* cited by examiner

*Primary Examiner*—Karl E Group
(74) *Attorney, Agent, or Firm*—Dickstein, Shapiro, LLP.

(57) ABSTRACT

A translucent ceramic having a high light transmittance is provided. It contains a perovskite compound having a composition represented by a general formula: $(Ba_{1-s-t}Sr_sCa_t)(M_xB1_yB2_z)_vO_w$ (where M contains at least one of Sn, Zr and Hf, B1 represents at least one of Mg, Zn, Y and In, B2 represents at least one of Ta and Nb, each of conditions of $0 \leq s \leq 0.99$, $0.01 \leq t \leq 0.45$, $x+y+z=1$, $0 < x \leq 0.9$, $1.00 \leq z/y \leq 2.40$, and $0.97 \leq v \leq 1.05$ is satisfied, and w represents a positive number for maintaining electrical neutrality) as a primary component. This translucent ceramic can be used as, for example, an objective lens (2) of an optical pickup (9) to provide advantages. In another aspect some of M is replaced by Ti.

20 Claims, 4 Drawing Sheets

13

14

TRANSLUCENT CERAMIC, METHOD FOR MANUFACTURING THE SAME, OPTICAL COMPONENT, AND OPTICAL DEVICE

This is a continuation of application Serial No. PCT/JP2006/305346, filed Mar. 17, 2006.

TECHNICAL FIELD

The present invention relates to a translucent ceramic useful as a material for optical components, e.g., lenses, a method for manufacturing the translucent ceramic, an optical component including the translucent ceramic, and an optical device.

BACKGROUND ART

As is described in Patent Document 1 and Patent Document 2, glass, plastic, a single crystal of lithium niobate ($LiNbO_3$) and or the like, has been previously used as a material for an optical component, e.g., a lens, mounted on an optical device, e.g., an optical pickup.

The glass and the plastic have high light transmittances and are easily worked into desired shapes. Therefore, glass and the plastic are primarily used for optical components, e.g., lenses. On the other hand, the single crystal of $LiNbO_3$ or the like is primarily used for an optical component, e.g., an optical waveguide, taking advantage of electrooptic properties and birefringence.

Further miniaturization and thickness reduction have been required of optical devices, e.g., an optical pickup, including such an optical component.

However, refractive indices of known glass and plastic materials are less than 1.9 and, therefore, there are limits to miniaturization and thickness reduction of the optical components and the optical devices including the known glasses and plastics. In particular, the plastic has a disadvantage that the moisture resistance is poor. In addition, there is also a disadvantage that it is difficult to effectively transmit or condense incident light because birefringence may occur.

On the other hand, the single crystal of $LiNbO_3$ or the like has, for example, a relatively high refractive index of 2.3. However, the single crystal of $LiNbO_3$ or the like has a disadvantage that it is difficult to use for optical components, e.g., a lens, because birefringence occurs and, thereby, the use is limited.

Examples of materials which cause no birefringence and which can provide excellent optical properties include translucent ceramic containing $Ba(Mg,Ta)O_3$ based perovskite or $Ba(Zn,Ta)O_3$ based perovskite as a primary component. These are described in, for example, Patent Document 3 and Patent Document 4, respectively.

However, such translucent ceramic containing $Ba(Mg,Ta)O_3$ based perovskite or $Ba(Zn,Ta)O_3$ based perovskite as a primary component is a polycrystalline substance. Therefore, there is an essential problem in that voids are liable to remain in a sintered body thereof. That is, light is liable to scatter when light passes through the translucent ceramic if many voids are present in the sintered body, and as a result, the light transmittance decreases.

The optical properties, e.g., the refractive index and the Abbe number, of the translucent ceramic containing $Ba(Mg,Ta)O_3$ based perovskite as a primary component can be changed by allowing Sn and/or Zr, which are tetravalent elements, to substitute for a part of Mg and/or Ta. The amount of change increases as the amount of substitution increases. However, the upper limit of the amount of substitution is a low 0.40 and, therefore, it is difficult to change the refractive index and the Abbe number to a large extent. For example, a change merely within the range of 2.071 to 2.082 can be obtained in terms of the refractive index.

Likewise, it is difficult to change the refractive index and the Abbe number of a translucent ceramic containing $Ba(Zn, Ta)O_3$ based perovskite as a primary component to a large extent.

Patent Document 1: Japanese Unexamined Patent Application Publication No. 5-127078 (all pages, FIG. 1)

Patent Document 2: Japanese Unexamined Patent Application Publication No. 7-244865 (claim 6, a paragraph [0024])

Patent Document 3: Japanese Unexamined Patent Application Publication No. 2004-75512 (all pages, all drawings)

Patent Document 4: Japanese Unexamined Patent Application Publication No. 2004-75516 (all pages, all drawings)

DISCLOSURE OF INVENTION

Problems to be Solved by the Invention

The present invention has been made in consideration of the above-described circumstances. Accordingly, an object of the present invention is to provide translucent ceramic having a high light transmittance and a method for manufacturing the translucent ceramic.

Another object of the present invention is to provide translucent ceramic capable of changing optical properties within a wide range and a method for manufacturing the translucent ceramic.

Another object of the present invention is to provide an optical component constructed by using the above-described translucent ceramic and an optical device including the optical component.

Means for Solving the Problems

A translucent ceramic according to a first aspect of the present invention contains a perovskite compound having a composition represented by a general formula: $(Ba_{1-s-t}Sr_sCa_t)(M_xB1_yB2_z)_vO_w$ (where M contains at least one of Sn, Zr and Hf, B1 represents at least one of Mg, Zn, Y and In, B2 represents at least one of Ta and Nb, each of conditions of $0 \leq s \leq 0.99$, $0.01 \leq t \leq 0.45$, $x+y+z=1$, $0<x \leq 0.9$, $1.00 \leq z/y \leq 2.40$, and $0.97 \leq v \leq 1.05$ is satisfied, and w represents a positive number for maintaining electrical neutrality) as a primary component.

Preferably, the translucent ceramic according the first aspect of the present invention exhibits a linear transmittance for visible light with a wavelength of 633 nm of 60% or more on a sample thickness of 0.4 mm basis.

A translucent ceramic according to a second aspect of the present invention contains a perovskite compound having a composition represented by a general formula: $(Ba_{1-s-t}Sr_sCa_t)(Ti_{x1}M_{x2}B1_yB2_z)_vO_w$ (where M contains at least one of Sn, Zr and Hf, B1 represents at least one of Mg, Zn, Y and In, B2 represents at least one of Ta and Nb, each of conditions of $0 \leq s \leq 0.92$, $0.08 \leq t \leq 0.40$, $x1+x2+y+z=1$, $0<x1+x2 \leq 0.9$, $0 \leq x2 \leq 0.6$, $1.00 \leq z/y \leq 2.40$, and $0.97 \leq v \leq 1.04$ is satisfied, and w represents a positive number for maintaining electrical neutrality) as a primary component. The translucent ceramic according to the second aspect is different from the above-described translucent ceramic according to the first aspect primarily in that tetravalent Ti is necessary in a B site, i.e., x1 is not 0. element to be substituted.

Preferably, the translucent ceramic according the second aspect of the present invention exhibits a linear transmittance for visible light with a wavelength of 633 nm of 20% or more on a sample thickness of 0.4 mm basis.

With respect to the translucent ceramic according to the second aspect of the present invention, more preferably, the ratio of the linear transmittance for visible light with a wavelength of 450 nm on a sample thickness of 0.4 mm basis to the linear transmittance for visible light with a wavelength of 633 nm on a sample thickness of 0.4 mm basis is 0.85 or more.

The translucent ceramic according to each of the first and the second aspects exerts an outstanding effect in the case where the translucent ceramic is a polycrystalline substance.

The present invention is also directed to a method for manufacturing the above-described translucent ceramic. The method for manufacturing the translucent ceramic according to an aspect of the present invention includes the steps of preparing an unfired ceramic compact produced by molding a raw material ceramic powder into a predetermined shape, preparing a co-firing composition having substantially the same composition as that of the above-described raw material ceramic powder, and firing the unfired ceramic compact in an atmosphere having an oxygen concentration of 90 percent by volume or more while the co-firing composition is in contact with the unfired ceramic compact.

In the method for manufacturing the translucent ceramic according to an aspect of the present invention, preferably, the co-firing composition is in the state of a powder and the firing step is conducted in the state in which the unfired ceramic compact is embedded in the powder of the co-firing composition.

Furthermore, the present invention is directed to an optical component including the above-described translucent ceramic and an optical device including the optical component.

ADVANTAGES

In the translucent ceramic according to an aspect of the present invention, the A site of the perovskite compound: $AB_vO_w$ (where v and w are positive numbers for maintaining electrical neutrality), which is a primary component, contains a predetermined amount of Ca. Therefore, voids in the sintered body can be reduced and, thereby, the light transmittance can increase. The mechanism of reduction of voids due to Ca is not certain.

Consequently, the degree of transparency of the optical component constructed by using the translucent ceramic according to an aspect of the present invention can increase, and an optical device including the optical component can exhibit excellent optical properties.

In particular, Ti has substituted for a part of the B site of the perovskite compound in the translucent ceramic according to the second aspect of the present invention. Therefore, the optical properties, e.g., the refractive index and the Abbe number, can be changed in a wide range. However, the light transmittance in a short wavelength range tends to decrease. The reason for this is believed to be reduction of Ti from tetravalent to trivalent. However, the above-described Ca is believed to suppress the reduction, although the mechanism is not certain, and have an effect of improving the light transmittance in a short wavelength range.

Consequently, the degree of transparency of the optical component constructed by using the translucent ceramic according to the second aspect of the present invention can increase in a wide wavelength range.

Figure 1:
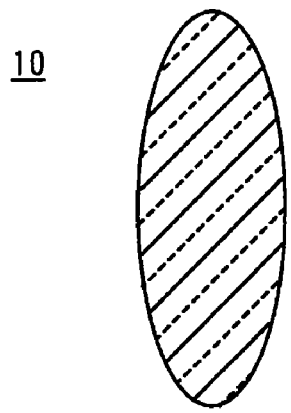
FIG. 1 is a sectional view showing a biconvex lens 10 as a first example of an optical component constructed by using the translucent ceramic according to an aspect of the present invention.
Figure 2:
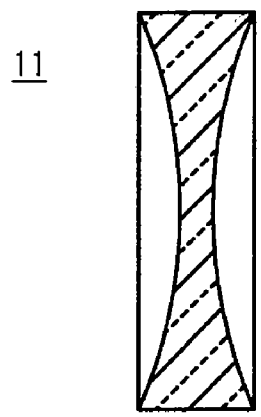
FIG. 2 is a sectional view showing a biconcave lens 11 as a second example of an optical component constructed by using the translucent ceramic according to an aspect of the present invention.
Figure 3:
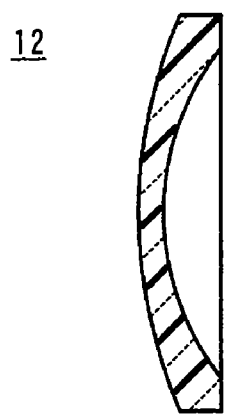
FIG. 3 is a sectional view showing a meniscus lens 12 as a third example of an optical component constructed by using the translucent ceramic according to an aspect of the present invention.
Figure 4:
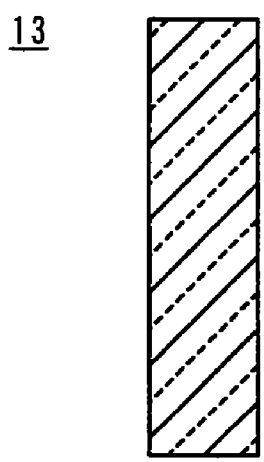
FIG. 4 is a sectional view showing an optical path length adjustment plate 13 as a fourth example of an optical component constructed by using the translucent ceramic according to an aspect of the present invention.
Figure 5:
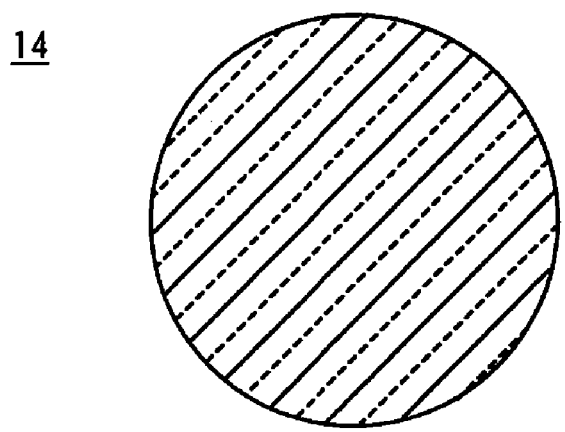
FIG. 5 is a sectional view showing a spherical lens 14 as a fifth example of an optical component constructed by using the translucent ceramic according to an aspect of the present invention.

REFERENCE NUMERALS 1 recording medium
2 objective lens
3 half mirror
4 collimator lens
5 semiconductor laser
6 condenser lens
7 photodetector
8 laser light
9 optical pickup
10 biconvex lens
11 biconcave lens
12 meniscus lens
13 optical path length adjustment plate
14 spherical lens

BEST MODE FOR CARRYING OUT THE INVENTION

The basic composition system of the translucent ceramic according to an aspect of the present invention is represented by $(Ba,Sr,Ca)\{(Mg,Zn,Y,In)(Ta,Nb)\}O_3$. This is essentially complex perovskite having a crystal system of a hexagonal system. The A site of perovskite is constituted by Ba, Sr and Ca and the B site of perovskite is constituted by divalent elements, such as Mg and Zn, trivalent elements, such as Y and In, and heptavalent elements, such as Ta and Nb.

The ratio z/y in the general formula of $(Ba_{1-s-t}Sr_sCa_t)(M_xB1_yB2_z)_vO_w$ which represents a composition of a primary component of the translucent ceramic according to the first aspect of the present invention is within the range of 1.00 to 2.40, the z/y corresponding to the ratio of (Ta,Nb) to (Mg,Zn, Y,In) in the above-described perovskite compounds. Therefore, the perovskite structure is maintained. Likewise, the z/y in the general formula $(Ba_{1-s-t}Sr_sCa_t)(Ti_{x1}M_{x2}B1_yB2_z)_vO_w$ which represents a composition of a primary component of the translucent ceramic according to the second aspect of the present invention is also within the range of 1.00 to 2.40. Therefore, the perovskite structure is maintained.

The B site must becomes tetravalent in total. In the case where B1 is a divalent element (Mg,Zn) and B2 is a heptavalent element (Ta,Nb), y:z becomes a value close to 1:2. In the case where B1 is a trivalent element (In,Y) and B2 is heptavalent element (Ta,Nb), y:z becomes a value close to 1:1. Since B1 may be a mixture of the divalent element and the trivalent element, the z/y takes on a value within a wide range of 1.00 to 2.40, as described above.

If the z/y goes out of the above-described range, the sinterability deteriorates and the linear transmittance for visible light decreases. For the same reason, the ratio v of the B site to the A site of perovskite is set within the range of 0.97 to 1.05 in the first aspect of the present invention, whereas in the second aspect of the present invention, the ratio v is set within the range of 0.97 to 1.04. The ratio w of the content of 0 becomes a value close to 3.

The B site of the complex perovskite is substituted with a tetravalent element, such as at least one of Sn, Zr and Hf, in the first aspect of the present invention, whereas the B site is substituted with tetravalent elements, such as Ti and at least one of Sn, Zr and Hf, in the second aspect of the present invention. Therefore, the crystal system of the complex perovskite is changed to a cubic system so as to exhibit the light translucency. The optical properties, e.g., the linear transmittance, the refractive index and the Abbe number, can be changed freely by adjusting the type, the combination and the amount of substitution of the tetravalent elements. The above-described Sn, Zr and Hf are no more than examples. Other elements may be used insofar as the elements are tetravalent elements capable of changing the crystal system to a cubic system. However, if the amount of substitution of the tetravalent element, that is, the value of x in the first aspect and the value of x1+x2 in the second aspect, exceeds 0.9, the linear transmittance decreases unfavorably.

In the second aspect of the present invention, Ti is necessary for the above-described tetravalent elements. This is because the presence of Ti has an advantage that the width of change of the above-described optical properties can increase significantly.

In this regard, the optical properties, e.g., the refractive index and the Abbe number, of the translucent ceramic, which is disclosed in Patent Document 3 (Japanese Unexamined Patent Application Publication No. 2004-75512) and which contains $Ba(Mg,Ta)O_3$ based perovskite as a primary component, can be changed by allowing Sn and/or Zr, which are tetravalent elements, to substitute for a part of Mg and/or Ta. The amount of change increases as the amount of substitution increases. However, the upper limit of the amount of substitution is a low 0.40 and, therefore, it is difficult to change the refractive index and the Abbe number to a large extent. For example, a change merely within the range of 2.071 to 2.082 can be obtained in terms of the refractive index.

On the other hand, with respect to the above-described translucent ceramic containing $Ba(Mg,Ta)O_3$ based perovskite as a primary component, in the case where the tetravalent substitution elements which substitute for a part of Mg and/or Ta contains Ti, as in an aspect of the present invention, the upper limit of the amount of substitution thereof can increase to a high 0.90. Therefore, the refractive index and the Abbe number can be changed to a large extent. For example, the refractive index can be changed within a wide range of about 2.08 to 2.36.

However, if the sum of the Ti content x1 and the content x2 of the other tetravalent elements exceeds 0.9, the linear transmittance becomes less than 20% unfavorably. It is preferable that the content x2 of the other tetravalent elements is 0.6 or less in the presence of Ti. If the content x2 exceeds 0.6, the linear transmittance becomes less than 20%.

A most distinctive feature common to the translucent ceramic according to the first and second aspects of the present invention is the fact that the elements in the A site include Ca.

In the first aspect of the present invention, when the amount t of substitution of Ca becomes 0.01 or more, voids in the ceramic sintered body becomes 20 ppm by volume or less, and the disadvantage that the incident light scatters is reduced. However, if the value of t exceeds 0.45, the linear transmittance becomes less than 60%. It is desirable that the linear transmittance is 60% or more. However, even if the linear transmittance becomes less than 60%, it is still possible to use as the translucent ceramic.

In the second aspect of the present invention, since the elements in the A site include Ca, the ratio of the linear transmittance for visible light with a wavelength of 450 nm to the linear transmittance for visible light with a wavelength of 633 nm (hereafter referred to as "F value") is improved. That is, the light transmittance in a short wavelength range is improved relatively, and coloring in the translucent ceramic is reduced.

In the case where the amount t of substitution of Ca is 0.08 or more, the above-described effects become remarkable, and the above-described F value becomes 0.85 or more. However, if the value of t exceeds 0.40, the linear transmittance becomes less than 20% unfavorably.

Each of Ca and the other constituent elements described above is located at a predetermined site of the perovskite compound. However, a small amount of elements may be present at grain boundaries or locate at another site within the bounds without impairing the purposes of the present invention.

The translucent ceramic according to an aspect of the present invention may contain impurities incidentally mixed during production within the bounds of not impairing the purposes of the present invention. Examples of such impurities contained in an oxide or a carbonate to be used as a raw material and impurities mixed in a production process include $Fe_2O_3$, $B_2O_3$, $Al_2O_3$, WO3, $Bi_2O_3$, $Sb_2O_5$, $P_2O_5$, CuO and rare earth oxides, e.g., $La_2O_3$.

Addition of $SiO_2$ as a sintering auxiliary can improve the sinterability of the ceramic. Put another way, addition of $SiO_2$ makes it possible to obtain a sintering density equivalent to that in grain growth, without allowing the grain growth to proceed to a large extent. The above-described suppression of grain growth decreases unevenness after a lens is worked and polished by using a $CeO_2$ abrasive (an abrasive not easily causing scratching). According to this as well, the transmittance can be improved slightly.

The method for manufacturing the translucent ceramic according to an aspect of the present invention will be described below.

In order to produce the translucent ceramic, an unfired ceramic compact produced by molding a raw material ceramic powder into a predetermined shape is prepared and, in addition, a co-firing composition is prepared, the co-firing composition having substantially the same composition as that of the raw material ceramic powder. Subsequently, a step of firing the unfired ceramic compact is conducted in an atmosphere having an oxygen concentration of 90 percent by volume or more while the co-firing composition is in contact with the unfired ceramic compact.

In the above-described manufacturing method, the co-firing composition refers to, for example, a powder produced by calcining and pulverizing a raw material formulated in such a way as to have the same composition as that of the above-described ceramic compact. The co-firing composition can suppress evaporation of the volatile components in the above-described ceramic compact during firing. Therefore, it is preferable that the firing step is conducted in the state in which the unfired ceramic compact is embedded in a powder of the co-firing composition. The co-firing composition is not limited to the powder and may be a compact or a sintered body.

It is preferable that the co-firing composition has the same composition as that of the raw material ceramic powder for the above-described ceramic compact. However, it is an acceptable level that the compositions are substantially equal. The co-firing composition has substantially the same composition as that of the raw material ceramic powder for the unfired ceramic compact. This refers to the fact that the compositions are equivalent composition systems containing the same constituent elements. It is not necessary that the two composition ratios are completely the same. The co-firing composition does not necessarily have a composition capable of providing the light translucency.

The pressure in the firing step may be atmospheric pressure or less. That is, a pressurized atmosphere as in HIP (Hot Isostatic Press) or the like is not necessary.

The translucent ceramic according to an aspect of the present invention exhibits a high linear transmittance. Formation of an anti-reflection film (AR film) on a surface can further improve the linear transmittance. For example, in the case where the linear transmittance is 74.8% and the refractive index is 2.114, the theoretical maximum value of the linear transmittance becomes 76.0% on the basis of Fresnel's law. At this time, the relative transmittance is 98.4% with reference to the theoretical value. It is indicated that there is almost no transmission loss in the inside of a sample. Therefore, the resulting linear transmittance can be made nearly a theoretical value by forming the anti-reflection film on the sample surface.

The translucent ceramic according to an aspect of the present invention can be used for optical components, e.g., lenses. Examples of lenses include a biconvex lens 10, a biconcave lens 11, a meniscus lens 12, an optical path length adjustment plate 13, and a spherical lens 14 as shown in FIG. 1 to FIG. 5, respectively.

An optical device including the above-described optical component will be described below with reference to an optical pickup.

Figure 6:
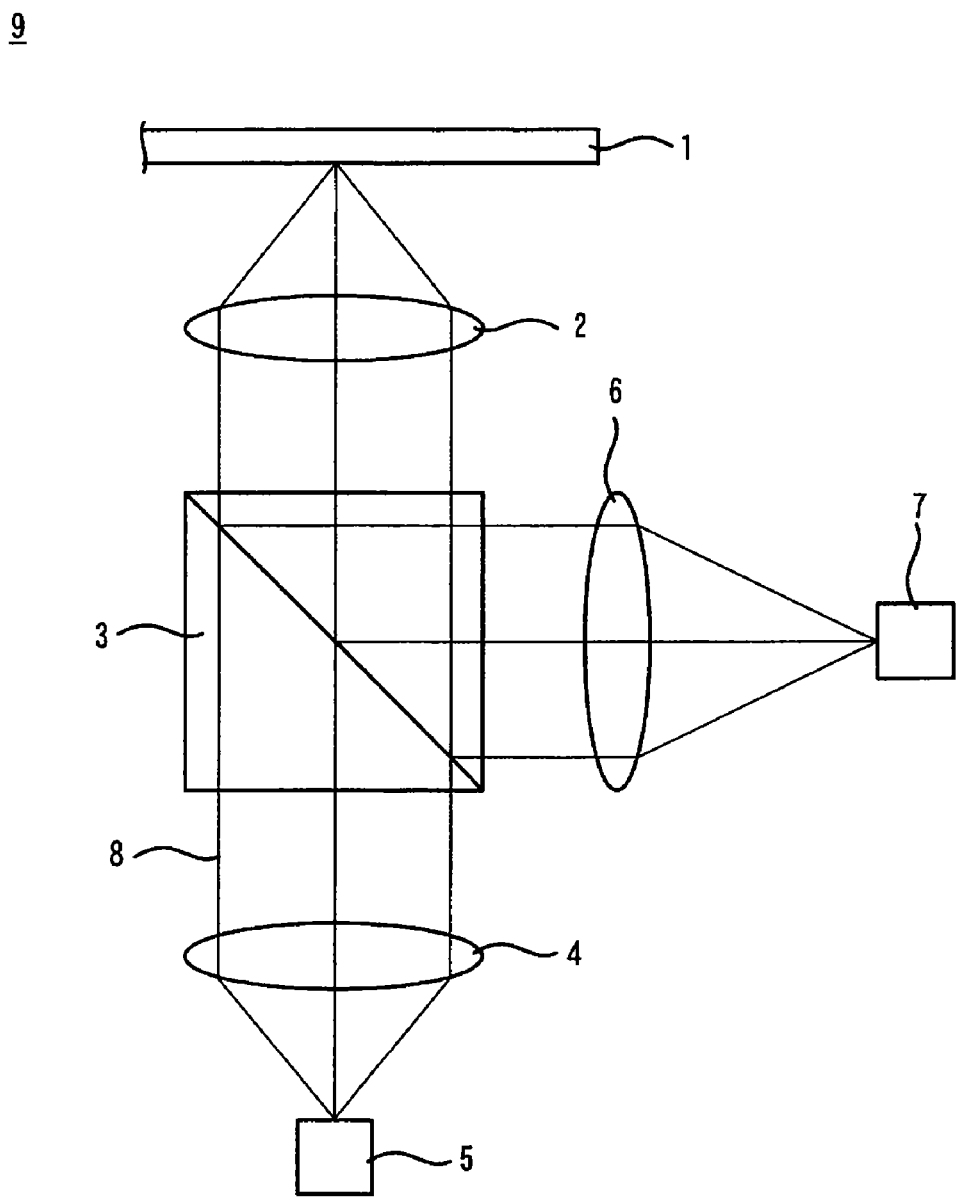
FIG. 6 is an elevation view illustrating an optical pickup 9 as an example of an apparatus including an optical component constructed by using the translucent ceramic according to an aspect of the present invention.

As shown in FIG. 6, an optical pickup 9 applies laser light 8 that is coherent light to a recording medium 1, e.g., a compact disk and a mini disk, and reproduces the information recorded on the recording medium 1 from the reflected light.

In the above-described optical pickup 9, a collimator lens 4 for converting the laser light 8 from a semiconductor laser 5 serving as a light source to collimated light is disposed, and a half mirror 3 is disposed on an optical path of the collimated light. This half mirror 3 passes through incident light from the collimator lens 4 in a straight line and changes the movement direction of the reflected light from the recording medium 1 about 90 degrees by reflection.

In the optical pickup 9, an objective lens 2 is disposed to condense the light incident from the half mirror 3 on a recording surface of the recording medium 1. This objective lens 2 also performs the function of feeding the reflected light from the recording medium 1 to the half mirror 3 efficiently. The phase of the reflected light incident on the half mirror 3 is changed by reflection and, thereby, the movement direction of the above-described reflected light is changed.

Furthermore, the optical pickup 9 includes a condenser lens 6 for condensing the reflected light, the movement direction of which has been changed. A photodetector 7 for reproducing the information from the reflected light is disposed at a position on which the reflected light is condensed.

In the optical pickup 9 having the above-described configuration, the translucent ceramic according to an aspect of the present invention can be used as a raw material for each of the objective lens 2, the half mirror 3, the collimator lens 4 and the condenser lens 6 to provide advantages, because the linear transmittance is high.

The translucent ceramic according to an aspect of the present invention will be described below with reference to Experimental examples. Among Experimental examples 1 to 7, as described below, Experimental examples 1 and 2 correspond to the first aspect of the present invention, and Experimental examples 3 to 7 correspond to the second aspect of the present invention.

EXPERIMENTAL EXAMPLE 1

Powders of $BaCO_3$, $SrCO_3$, $CaCO_3$, ZnO, $MgCO_3$, $Y_2O_3$, $In_2O_3$, $Ta_2O_5$, $Nb_2O_5$, $SnO_2$, $ZrO_2$, and $HfO_2$, each having a high purity, were prepared as a raw material. Each of the raw material powders was weighed in such a way as to prepare each of Samples represented by the general formula $(Ba_{1-s-t}Sr_sCa_t)(M_xB1_yB2_z)_vO_w$ (where M represents at least one of Sn, Zr and Hf, B1 represents at least one of Mg, Zn, Y and In, B2 represents at least one of Ta and Nb, and w represents a positive number for maintaining electrical neutrality), as shown in Table 1 to Table 5. Subsequently, $SiO_2$ was added to each raw material powder in such a way that it content becomes 100 ppm by weight. Thereafter, wet mixing was conducted in a ball mill for 16 hours. The resulting mixture was dried and calcined at 1,300° C. for 3 hours, so that a calcined powder was produced. The value of w was about 3 after the calcination.

TABLE 1

| Sample No. | Element represented by M and content | Element represented by B1 and content | Element represented by B2 and content | s | t | x | y | z | z/y | v | Linear transmittance ($\lambda$ = 633 nm) [%] | Void volume fraction [ppm by volume] | Remarks |
|---|---|---|---|---|---|---|---|---|---|---|---|---|---|
| *1 | Sn: 0.240 | Mg: 0.258 | Ta: 0.502 | 0 | 0 | 0.24 | 0.258 | 0.502 | 1.95 | 0.950 | — | — | not sintered |
| *2 | Sn: 0.240 | Mg: 0.258 | Ta: 0.502 | 0 | 0 | 0.24 | 0.258 | 0.502 | 1.95 | 0.970 | 20.3 | 1520.34 | |
| *3 | Sn: 0.240 | Mg: 0.258 | Ta: 0.502 | 0 | 0 | 0.24 | 0.258 | 0.502 | 1.95 | 0.990 | 70.6 | 538.99 | |
| *4 | Sn: 0.240 | Mg: 0.258 | Ta: 0.502 | 0 | 0 | 0.24 | 0.258 | 0.502 | 1.95 | 1.010 | 75.8 | 260.91 | |
| *5 | Sn: 0.240 | Mg: 0.258 | Ta: 0.502 | 0 | 0 | 0.24 | 0.258 | 0.502 | 1.95 | 1.030 | 77.3 | 46.65 | |

TABLE 1-continued

| Sample No. | Element represented by M and content | Element represented by B1 and content | Element represented by B2 and content | s | t | x | y | z | z/y | v | Linear transmittance (λ = 633 nm) [%] | Void volume fraction [ppm by volume] | Remarks |
|---|---|---|---|---|---|---|---|---|---|---|---|---|---|
| *6 | Sn: 0.240 | Mg: 0.258 | Ta: 0.502 | 0 | 0 | 0.24 | 0.258 | 0.502 | 1.95 | 1.050 | 77.1 | 54.66 | |
| *7 | Sn: 0.240 | Mg: 0.258 | Ta: 0.502 | 0 | 0 | 0.24 | 0.258 | 0.502 | 1.95 | 1.070 | 22.0 | 38.07 | |
| *8 | Sn: 0.240 | Mg: 0.258 | Ta: 0.502 | 0 | 0.01 | 0.24 | 0.258 | 0.502 | 1.95 | 0.950 | — | — | not sintered |
| 9 | Sn: 0.240 | Mg: 0.258 | Ta: 0.502 | 0 | 0.01 | 0.24 | 0.258 | 0.502 | 1.95 | 0.970 | 77.0 | 12.99 | |
| 10 | Sn: 0.240 | Mg: 0.258 | Ta: 0.502 | 0 | 0.01 | 0.24 | 0.258 | 0.502 | 1.95 | 0.990 | 77.6 | 8.52 | |
| 11 | Sn: 0.240 | Mg: 0.258 | Ta: 0.502 | 0 | 0.01 | 0.24 | 0.258 | 0.502 | 1.95 | 1.010 | 78.1 | 6.19 | |
| 12 | Sn: 0.240 | Mg: 0.258 | Ta: 0.502 | 0 | 0.01 | 0.24 | 0.258 | 0.502 | 1.95 | 1.030 | 77.5 | 6.21 | |
| 13 | Sn: 0.240 | Mg: 0.258 | Ta: 0.502 | 0 | 0.01 | 0.24 | 0.258 | 0.502 | 1.95 | 1.050 | 77.8 | 6.31 | |
| *14 | Sn: 0.240 | Mg: 0.258 | Ta: 0.502 | 0 | 0.01 | 0.24 | 0.258 | 0.502 | 1.95 | 1.070 | 26.5 | 6.61 | |
| 15 | Sn: 0.240 | Mg: 0.258 | Ta: 0.502 | 0 | 0.05 | 0.24 | 0.258 | 0.502 | 1.95 | 0.970 | 77.8 | 5.11 | |
| 16 | Sn: 0.240 | Mg: 0.258 | Ta: 0.502 | 0 | 0.05 | 0.24 | 0.258 | 0.502 | 1.95 | 1.010 | 78.1 | 2.92 | |
| 17 | Sn: 0.240 | Mg: 0.258 | Ta: 0.502 | 0 | 0.05 | 0.24 | 0.258 | 0.502 | 1.95 | 1.050 | 77.9 | 8.19 | |
| 18 | Sn: 0.240 | Mg: 0.258 | Ta: 0.502 | 0 | 0.2 | 0.24 | 0.258 | 0.502 | 1.95 | 0.970 | 77.8 | 3.61 | |
| 19 | Sn: 0.240 | Mg: 0.258 | Ta: 0.502 | 0 | 0.2 | 0.24 | 0.258 | 0.502 | 1.95 | 1.010 | 77.8 | 4.22 | |
| 20 | Sn: 0.240 | Mg: 0.258 | Ta: 0.502 | 0 | 0.2 | 0.24 | 0.258 | 0.502 | 1.95 | 1.050 | 78.0 | 3.86 | |

TABLE 2

| Sample No. | Element represented by M and content | Element represented by B1 and content | Element represented by B2 and content | s | t | x | y | z | z/y | v | Linear transmittance (λ = 633 nm) [%] | Void volume fraction [ppm by volume] | Remarks |
|---|---|---|---|---|---|---|---|---|---|---|---|---|---|
| 21 | Sn: 0.240 | Mg: 0.258 | Ta: 0.502 | 0 | 0.4 | 0.24 | 0.258 | 0.502 | 1.95 | 0.970 | 77.5 | 3.39 | |
| 22 | Sn: 0.240 | Mg: 0.258 | Ta: 0.502 | 0 | 0.4 | 0.24 | 0.258 | 0.502 | 1.95 | 1.010 | 77.6 | 5.01 | |
| 23 | Sn: 0.240 | Mg: 0.258 | Ta: 0.502 | 0 | 0.4 | 0.24 | 0.258 | 0.502 | 1.95 | 1.050 | 77.1 | 6.06 | |
| *24 | Sn: 0.240 | Mg: 0.258 | Ta: 0.502 | 0 | 0.45 | 0.24 | 0.258 | 0.502 | 1.95 | 0.950 | — | — | not sintered |
| 25 | Sn: 0.240 | Mg: 0.258 | Ta: 0.502 | 0 | 0.45 | 0.24 | 0.258 | 0.502 | 1.95 | 0.970 | 73.3 | 1.52 | |
| 26 | Sn: 0.240 | Mg: 0.258 | Ta: 0.502 | 0 | 0.45 | 0.24 | 0.258 | 0.502 | 1.95 | 1.010 | 71.5 | 4.42 | |
| 27 | Sn: 0.240 | Mg: 0.258 | Ta: 0.502 | 0 | 0.45 | 0.24 | 0.258 | 0.502 | 1.95 | 1.050 | 68.8 | 3.61 | |
| *28 | Sn: 0.240 | Mg: 0.258 | Ta: 0.502 | 0 | 0.45 | 0.24 | 0.258 | 0.502 | 1.95 | 1.070 | 9.6 | — | |
| *29 | Sn: 0.240 | Mg: 0.258 | Ta: 0.502 | 0 | 0.5 | 0.24 | 0.258 | 0.502 | 1.95 | 0.950 | — | — | not sintered |
| *30 | Sn: 0.240 | Mg: 0.258 | Ta: 0.502 | 0 | 0.5 | 0.24 | 0.258 | 0.502 | 1.95 | 0.970 | 41.9 | 4.01 | |
| *31 | Sn: 0.240 | Mg: 0.258 | Ta: 0.502 | 0 | 0.5 | 0.24 | 0.258 | 0.502 | 1.95 | 1.010 | 43.2 | 3.74 | |
| *32 | Sn: 0.240 | Mg: 0.258 | Ta: 0.502 | 0 | 0.5 | 0.24 | 0.258 | 0.502 | 1.95 | 1.050 | 40.5 | 2.83 | |
| *33 | Sn: 0.240 | Mg: 0.258 | Ta: 0.502 | 0 | 0.5 | 0.24 | 0.258 | 0.502 | 1.95 | 1.070 | 3.2 | — | |
| *34 | — | Mg: 0.339 | Ta: 0.661 | 0 | 0.2 | 0.00 | 0.339 | 0.661 | 1.95 | 1.010 | 36.5 | 6.12 | |
| 35 | Sn: 0.080 | Mg: 0.312 | Ta: 0.608 | 0 | 0.2 | 0.08 | 0.312 | 0.608 | 1.95 | 1.010 | 73.3 | 7.15 | |
| 36 | Sn: 0.160 | Mg: 0.285 | Ta: 0.555 | 0 | 0.2 | 0.16 | 0.285 | 0.555 | 1.95 | 1.010 | 77.6 | 2.88 | |
| 37 | Sn: 0.320 | Mg: 0.231 | Ta: 0.449 | 0 | 0.2 | 0.32 | 0.231 | 0.449 | 1.95 | 1.010 | 78.1 | 3.69 | |
| 38 | Sn: 0.500 | Mg: 0.169 | Ta: 0.331 | 0 | 0.2 | 0.50 | 0.169 | 0.331 | 1.95 | 1.010 | 77.8 | 4.00 | |
| 39 | Sn: 0.700 | Mg: 0.102 | Ta: 0.198 | 0 | 0.2 | 0.70 | 0.102 | 0.198 | 1.95 | 1.010 | 76.9 | 2.64 | |
| 40 | Sn: 0.900 | Mg: 0.034 | Ta: 0.066 | 0 | 0.2 | 0.90 | 0.034 | 0.066 | 1.95 | 1.010 | 64.3 | 4.36 | |
| *41 | Sn: 1.000 | — | — | 0 | 0.2 | 1.00 | 0.000 | 0.000 | 1.95 | 1.010 | 13.8 | — | |

TABLE 3

| Sample No. | Element represented by M and content | Element represented by B1 and content | Element represented by B2 and content | s | t | x | y | z | z/y | v | Linear transmittance (λ = 633 nm) [%] | Void volume fraction [ppm by volume] | Remarks |
|---|---|---|---|---|---|---|---|---|---|---|---|---|---|
| 42 | Sn: 0.240 | Mg: 0.292 | Ta: 0.468 | 0 | 0.2 | 0.24 | 0.292 | 0.468 | 1.60 | 1.010 | 65.8 | 5.73 | |
| 43 | Sn: 0.240 | Mg: 0.271 | Ta: 0.489 | 0 | 0.2 | 0.24 | 0.271 | 0.489 | 1.80 | 1.010 | 77.6 | 4.41 | |
| 44 | Sn: 0.240 | Mg: 0.238 | Ta: 0.523 | 0 | 0.2 | 0.24 | 0.238 | 0.523 | 2.20 | 1.010 | 78.1 | 4.61 | |
| 45 | Sn: 0.240 | Mg: 0.224 | Ta: 0.536 | 0 | 0.2 | 0.24 | 0.224 | 0.536 | 2.40 | 1.010 | 70.9 | 5.56 | |
| *46 | Sn: 0.240 | Mg: 0.211 | Ta: 0.549 | 0 | 0.2 | 0.24 | 0.211 | 0.549 | 2.60 | 1.010 | 4.6 | — | |
| 47 | Sn: 0.240 | Mg: 0.258 | Ta: 0.502 | 0.4 | 0.2 | 0.24 | 0.258 | 0.502 | 1.95 | 1.010 | 77.8 | 3.50 | |
| 48 | Sn: 0.240 | Mg: 0.258 | Ta: 0.502 | 0.8 | 0.2 | 0.24 | 0.258 | 0.502 | 1.95 | 1.010 | 77.6 | 4.09 | |
| 49 | Sn: 0.16 Zr: 0.08 | Mg: 0.258 | Ta: 0.502 | 0 | 0.2 | 0.24 | 0.258 | 0.502 | 1.95 | 1.010 | 77.6 | 4.56 | |
| 50 | Sn: 0.16 Zr: 0.08 | Mg: 0.258 | Ta: 0.251 Nb: 0.251 | 0 | 0.2 | 0.24 | 0.258 | 0.502 | 1.95 | 1.010 | 75.6 | 6.65 | |
| 51 | Sn: 0.16 Zr: 0.08 | Mg: 0.258 | Nb: 0.502 | 0 | 0.2 | 0.24 | 0.258 | 0.502 | 1.95 | 1.010 | 73.9 | 5.44 | |

TABLE 4

| Sample No. | Element represented by M and content | Element represented by B1 and content | Element represented by B2 and content | s | t | x | y | z | z/y | v | Linear transmittance (λ = 633 nm) [%] | Void volume fraction [ppm by volume] | Remarks |
|---|---|---|---|---|---|---|---|---|---|---|---|---|---|
| 52 | Hf: 0.240 | Mg: 0.258 | Ta: 0.502 | 0 | 0.2 | 0.24 | 0.258 | 0.502 | 1.95 | 1.010 | 71.2 | 7.57 | |
| 53 | Hf: 0.240 | Mg: 0.258 | Ta: 0.251 Nb: 0.251 | 0 | 0.2 | 0.24 | 0.258 | 0.502 | 1.95 | 1.010 | 70.3 | 6.33 | |
| 54 | Hf: 0.240 | Mg: 0.258 | Nb: 0.502 | 0 | 0.2 | 0.24 | 0.258 | 0.502 | 1.95 | 1.010 | 69.5 | 3.87 | |
| 55 | Sn: 0.240 | Mg: 0.172 Zn: 0.086 | Ta: 0.502 | 0 | 0.2 | 0.24 | 0.258 | 0.502 | 1.95 | 1.010 | 74.8 | 12.52 | |
| 56 | Sn: 0.240 | Mg: 0.172 Zn: 0.086 | Ta: 0.251 Nb: 0.251 | 0 | 0.2 | 0.24 | 0.258 | 0.502 | 1.95 | 1.010 | 75.2 | 9.87 | |
| 57 | Sn: 0.240 | Mg: 0.172 Zn: 0.086 | Nb: 0.502 | 0 | 0.2 | 0.24 | 0.258 | 0.502 | 1.95 | 1.010 | 72.6 | 8.12 | |
| 58 | Sn: 0.240 | Zn: 0.258 | Ta: 0.502 | 0 | 0.2 | 0.24 | 0.258 | 0.502 | 1.95 | 1.010 | 64.6 | 14.39 | |
| 59 | Sn: 0.16 Zr: 0.08 | Mg: 0.258 | Ta: 0.251 Nb: 0.251 | 0 | 0.2 | 0.24 | 0.258 | 0.502 | 1.95 | 1.010 | 76.6 | 5.24 | |
| 60 | Sn: 0.16 Zr: 0.08 | Mg: 0.172 Zn: 0.086 | Ta: 0.502 | 0 | 0.2 | 0.24 | 0.258 | 0.502 | 1.95 | 1.010 | 76.5 | 6.36 | |
| 61 | Sn: 0.16 Zr: 0.08 | Mg: 0.172 Zn: 0.086 | Ta: 0.502 | 0.8 | 0.2 | 0.24 | 0.258 | 0.502 | 1.95 | 1.010 | 75.9 | 6.91 | |

TABLE 5

| Sample No. | Element represented by M and content | Element represented by B1 and content | Element represented by B2 and content | s | t | x | y | z | z/y | v | Linear transmittance (λ = 633 nm) [%] | Void volume fraction [ppm by volume] | Remarks |
|---|---|---|---|---|---|---|---|---|---|---|---|---|---|
| *62 | Sn: 0.240 | Y: 0.384 | Ta: 0.376 | 0 | 0.2 | 0.24 | 0.384 | 0.376 | 0.98 | 0.990 | — | — | not sintered |
| 63 | Sn: 0.240 | Y: 0.380 | Ta: 0.380 | 0 | 0.2 | 0.24 | 0.380 | 0.380 | 1.00 | 0.990 | 62.1 | 7.21 | |
| 64 | Sn: 0.240 | Y: 0.376 | Ta: 0.384 | 0 | 0.2 | 0.24 | 0.376 | 0.384 | 1.02 | 0.990 | 73.1 | 6.60 | |
| 65 | Sn: 0.240 | In: 0.376 | Ta: 0.384 | 0 | 0.2 | 0.24 | 0.376 | 0.384 | 1.02 | 0.990 | 66.5 | 5.35 | |
| 66 | Sn: 0.240 | Y: 0.376 | Nb: 0.384 | 0 | 0.2 | 0.24 | 0.376 | 0.384 | 1.02 | 0.990 | 69.7 | 8.23 | |
| 67 | Sn: 0.240 | In: 0.376 | Nb: 0.384 | 0 | 0.2 | 0.24 | 0.376 | 0.384 | 1.02 | 0.990 | 63.4 | 4.89 | |
| 68 | Sn: 0.240 | Y: 0.376 | Ta: 0.384 | 0.8 | 0.2 | 0.24 | 0.376 | 0.384 | 1.02 | 0.990 | 65.2 | 6.15 | |
| 69 | Sn: 0.240 | In: 0.376 | Ta: 0.384 | 0.8 | 0.2 | 0.24 | 0.376 | 0.384 | 1.02 | 0.990 | 63.1 | 6.44 | |
| 70 | Sn: 0.240 | Y: 0.376 | Nb: 0.384 | 0.8 | 0.2 | 0.24 | 0.376 | 0.384 | 1.02 | 0.990 | 62.7 | 4.70 | |
| 71 | Sn: 0.240 | In: 0.376 | Nb: 0.384 | 0.8 | 0.2 | 0.24 | 0.376 | 0.384 | 1.02 | 0.990 | 63.9 | 5.72 | |
| 72 | Sn: 0.240 | Mg: 0129 Y: 0.188 | Ta: 0.443 | 0 | 0.2 | 0.24 | 0.317 | 0.443 | 1.40 | 0.990 | 71.8 | 6.57 | |
| 73 | Sn: 0.240 | Zn: 0.129 Y: 0.188 | Ta: 0.443 | 0 | 0.2 | 0.24 | 0.317 | 0.443 | 1.40 | 0.990 | 72.3 | 9.62 | |

Regarding the expression in each of columns "Element represented by M and content", "Element represented by B1 and content", and "Element represented by B2 and content" in Table 1 to Table 5, in the case where one element is represented by M, B1 or B2, the content of the element is equal to the value of x, y, or z. In the case where at least two elements are represented by M, B1 or B2, the total content of the elements is equal to the value of x, y or z.

The above-described calcined powder was put into a ball mill together with water and an organic binder, and wet-pulverization was conducted for 16 hours. Ethyl cellulose was used as the organic binder.

The above-described pulverized material was dried and, thereafter, put through a 50-mesh screen (sieve) so as to granulate it. The resulting powder was press-molded by being pressed at a pressure of 196 MPa, so that an unfired disk-shaped ceramic compact having a diameter of 30 mm and a thickness of 2 mm was produced.

The above-described unfired ceramic compact was embedded in a powder having the same composition as that of the raw material ceramic powder contained in the ceramic compact. The resulting compact embedded in the powder was put into a firing furnace, and was heated in an air atmosphere, so that a binder removal treatment was conducted. Oxygen was fed into the furnace while the temperature was raised continuously and, thereby, the oxygen concentration in the firing atmosphere was increased to about 98 percent by volume in a maximum temperature range of 1,600° C. to 1,700° C. An optimum maximum temperature was selected appropriately on the basis of the material composition, and the maximum temperature was 1,625° C. for Sample 11. The compact was fired for 20 hours while this firing temperature and the oxygen concentration were maintained, so as to produce a sintered body. The total pressure during the firing was set at 1 atmosphere or less.

The thus produced sintered body was mirror-finished, and shaped into a disk having a thickness of 0.4 mm, so that a translucent ceramic sample was produced.

For each of the above-described Samples, the linear transmittance at a wavelength λ of 633 nm and the amount of remaining voids were measured. A spectrophotometer (UV-2500) produced by SHIMADZU CORPORATION was used for measuring the linear transmittance that is an index of the light translucency. A transmission microscope was used for measuring the amount of remaining voids. The number of voids observed in the z direction (sample thickness direction)

and the void diameters were observed in three fields of view under an observation magnification of 450 times or 1,500 times. The amount of remaining voids was determined from these results, and was converted to the volume, so that the void volume fraction was calculated.

The linear transmittance and the void volume fraction determined as described above are shown in Table 1 to Table 5.

In Table 1 to Table 5, asterisked sample numbers indicate samples which are out of the scope of the present invention.

As is clear from Table 1 to Table 5, Samples 9 to 13, to 23, 25 to 27, 35 to 40, 42 to 45, 47 to 61, and 63 to 73, which were within the scope of the present invention, satisfied each of the conditions of $0 \leq s \leq 0.99$, $0.01 \leq t \leq 0.45$, $x+y+z=1$, $0 < x \leq 0.9$, $1.00 \leq z/y \leq 2.40$, and $0.97 \leq v \leq 1.05$. Consequently, the linear transmittances were 60% or more, and the void volume fraction were less than 20 ppm by volume.

On the other hand, Samples 1, 8, 24 and 29, which were out of the scope of the present invention because values of v were less than 0.97, did not sintered in the above-described sintering step. In Samples 7, 14, 28 and 33, which were out of the scope of the present invention because values of v exceeded 1.05, heterogeneous phases remained and, thereby, the linear transmittance fell below 60% significantly. In particular, for Sample 7, the void volume fraction was 20 ppm by volume or more, and for Samples 28 and 33, it was impossible to measure the void volume fraction.

With respect to Samples 2 to 6, which were out of the scope of the present invention because the values of t were less than 0.01, the effect of containing Ca was not exerted, and the void volume fraction were 20 ppm by volume or more. In particular, for Sample 2, the linear transmittance fell below 60% significantly. For Samples 30 to 32, since the values of t exceeded 0.45, the linear transmittance fell below 60%.

With respect to Sample 34, since the value of x was 0, the linear transmittance fell below 60%. For Sample 41, since the value of x exceeded 0.9, the linear transmittance fell below 60% significantly, and it was impossible to measure the void volume fraction.

With respect to Sample 46, since the value of z/y exceeded 2.40, the linear transmittance fell below 60% significantly, and it was impossible to measure the void volume fraction. Sample 62 did not sintered in the above-described sintering step, because the value of z/y was less than 1.00.

EXPERIMENTAL EXAMPLE 2

Figure 7:
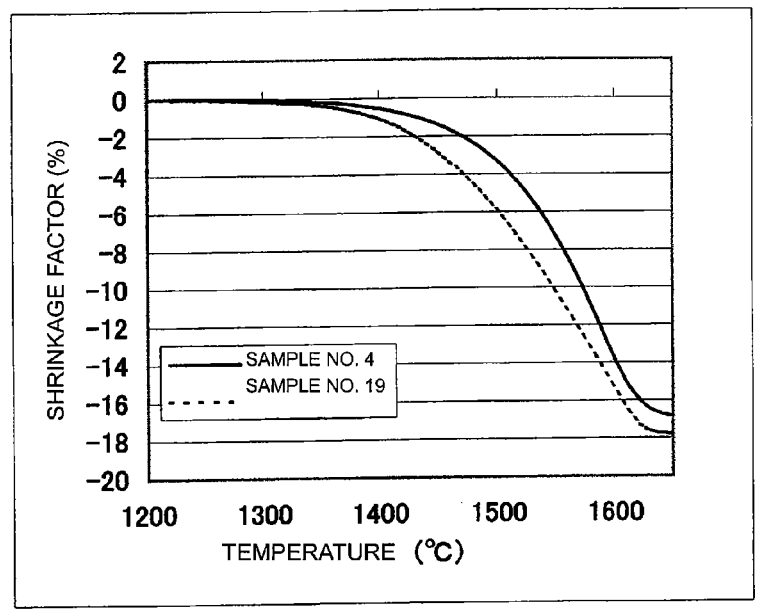
FIG. 7 is a diagram showing TMA curves determined on the basis of an analysis of Sample 4 as a comparative example and Sample 19 as an example, the analysis being conducted by a TMA method in Experimental example 2.

With respect to Sample 4 prepared as a comparative example in the above-described Experimental example 1 and Sample 19 prepared as an example, the shrinkage factor with reference to the dimension before firing was determined by a TMA method (thermal mechanical analysis method) at a temperature rising rate of 5° C./min. FIG. 7 shows TMA curves, where the vertical axis indicates the shrinkage factor and the horizontal axis indicates the temperature.

As is clear from FIG. 7, shrinkage starts earlier and the absolute value of the shrinkage factor when the shrinkage settles down is larger with respect to Sample 19 as compared with those in comparative Sample 4 example. It is believed that the difference in void volume factor reflects the above-described difference in the shrinkage behavior.

EXPERIMENTAL EXAMPLE 3

Powders of $BaCO_3$, $SrCO_3$, $CaCO_3$, $ZnO$, $MgCO_3$, $Y_2O_3$, $In_2O_3$, $Ta_2O_5$, $Nb_2O_5$, $SnO_2$, $ZrO_2$, $TiO_2$ and $HfO_2$, each having a high purity, were prepared as a raw material. Each of the raw material powders was weighed in such a way as to prepare each of Samples represented by the general formula $(Ba_{1-s-t}Sr_sCa_t)(Ti_{x1}M_{x2}B1_yB2_z)_vO_w$ (where M represents at least one of Sn, Zr and Hf, B1 represents at least one of Mg, Zn, Y and In, B2 represents at least one of Ta and Nb, and w represents a positive number for maintaining electrical neutrality), as shown in Table 6 to Table 10. Thereafter, wet mixing was conducted in a ball mill for 16 hours. The resulting mixture was dried and calcined at 1,300° C. for 3 hours, so that a calcined powder was produced. The value of w was about 3 after the calcination.

TABLE 6

| Sample No. | Element represented by M and content | Element represented by B1 and content | Element represented by B2 and content | s | t | x1 | x2 | y | z | z/y | v | Linear transmittance [%] 633 nm | Linear transmittance [%] 450 nm | F value | Refractive index (633 nm) | Abbe number $v_d$ |
|---|---|---|---|---|---|---|---|---|---|---|---|---|---|---|---|---|
| *101 | — | Mg: 0.258 | Ta: 0.502 | 0 | 0 | 0.24 | 0.00 | 0.258 | 0.502 | 1.95 | 1.025 | 58.9 | 48.6 | 0.825 | 2.149 | 24.1 |
| *102 | — | Mg: 0.258 | Ta: 0.502 | 0 | 0.04 | 0.24 | 0.00 | 0.258 | 0.502 | 1.95 | 1.025 | 59.0 | 48.6 | 0.824 | 2.147 | 24.1 |
| 103 | — | Mg: 0.258 | Ta: 0.502 | 0 | 0.08 | 0.24 | 0.00 | 0.258 | 0.502 | 1.95 | 1.025 | 64.8 | 59.4 | 0.917 | 2.146 | 24.1 |
| 104 | — | Mg: 0.258 | Ta: 0.502 | 0 | 0.12 | 0.24 | 0.00 | 0.258 | 0.502 | 1.95 | 0.995 | 70.1 | 68.7 | 0.980 | 2.143 | 24.1 |
| 105 | — | Mg: 0.258 | Ta: 0.502 | 0 | 0.16 | 0.24 | 0.00 | 0.258 | 0.502 | 1.95 | 0.990 | 75.5 | 72.0 | 0.954 | 2.140 | 24.0 |
| *106 | — | Mg: 0.258 | Ta: 0.502 | 0 | 0.2 | 0.24 | 0.00 | 0.258 | 0.502 | 1.95 | 1.045 | 7.5 | 5.8 | 0.773 | 2.129 | 24.6 |
| 107 | — | Mg: 0.258 | Ta: 0.502 | 0 | 0.2 | 0.24 | 0.00 | 0.258 | 0.502 | 1.95 | 1.040 | 22.0 | 19.5 | 0.886 | 2.130 | 24.5 |
| 108 | — | Mg: 0.258 | Ta: 0.502 | 0 | 0.2 | 0.24 | 0.00 | 0.258 | 0.502 | 1.95 | 1.025 | 32.5 | 29.8 | 0.917 | 2.132 | 24.4 |
| 109 | — | Mg: 0.258 | Ta: 0.502 | 0 | 0.2 | 0.24 | 0.00 | 0.258 | 0.502 | 1.95 | 1.010 | 38.1 | 34.3 | 0.900 | 2.134 | 24.2 |
| 110 | — | Mg: 0.258 | Ta: 0.502 | 0 | 0.2 | 0.24 | 0.00 | 0.258 | 0.502 | 1.95 | 1.005 | 62.1 | 58.9 | 0.948 | 2.135 | 24.2 |
| 111 | — | Mg: 0.258 | Ta: 0.502 | 0 | 0.2 | 0.24 | 0.00 | 0.258 | 0.502 | 1.95 | 0.995 | 70.0 | 64.5 | 0.921 | 2.136 | 24.1 |
| 112 | — | Mg: 0.258 | Ta: 0.502 | 0 | 0.2 | 0.24 | 0.00 | 0.258 | 0.502 | 1.95 | 0.990 | 76.1 | 73.8 | 0.970 | 2.136 | 24.1 |
| 113 | — | Mg: 0.258 | Ta: 0.502 | 0 | 0.2 | 0.24 | 0.00 | 0.258 | 0.502 | 1.95 | 0.988 | 76.1 | 74.0 | 0.972 | 2.136 | 24.0 |
| 114 | — | Mg: 0.258 | Ta: 0.502 | 0 | 0.2 | 0.24 | 0.00 | 0.258 | 0.502 | 1.95 | 0.986 | 76.2 | 73.7 | 0.967 | 2.136 | 24.0 |
| 115 | — | Mg: 0.258 | Ta: 0.502 | 0 | 0.2 | 0.24 | 0.00 | 0.258 | 0.502 | 1.95 | 0.984 | 76.0 | 72.4 | 0.953 | 2.136 | 24.0 |
| 116 | — | Mg: 0.258 | Ta: 0.502 | 0 | 0.2 | 0.24 | 0.00 | 0.258 | 0.502 | 1.95 | 0.980 | 62.7 | 58.2 | 0.928 | 2.137 | 24.1 |

TABLE 7

| Sample No. | Element represented by M and content | Element represented by B1 and content | Element represented by B2 and content | s | t | x1 | x2 | y | z | z/y | v | Linear transmittance [%] 633 nm | Linear transmittance [%] 450 nm | F value | Refractive index (633 nm) | Abbe number $v_d$ |
|---|---|---|---|---|---|---|---|---|---|---|---|---|---|---|---|---|
| 117 | — | Mg: 0.258 | Ta: 0.502 | 0 | 0.2 | 0.24 | 0.00 | 0.258 | 0.502 | 1.95 | 0.975 | 59.5 | 54.1 | 0.909 | 2.136 | 24.1 |
| 118 | — | Mg: 0.258 | Ta: 0.502 | 0 | 0.2 | 0.24 | 0.00 | 0.258 | 0.502 | 1.95 | 0.970 | 32.9 | 29.8 | 0.906 | 2.136 | 24.1 |
| *119 | — | Mg: 0.258 | Ta: 0.502 | 0 | 0.2 | 0.24 | 0.00 | 0.258 | 0.502 | 1.95 | 0.965 | 16.1 | 13.6 | 0.842 | 2.135 | 24.2 |
| 120 | — | Mg: 0.262 | Ta: 0.498 | 0 | 0.2 | 0.24 | 0.00 | 0.262 | 0.498 | 1.90 | 0.988 | 73.3 | 69.8 | 0.952 | 2.136 | 24.1 |
| 121 | — | Mg: 0.259 | Ta: 0.501 | 0 | 0.2 | 0.24 | 0.00 | 0.259 | 0.501 | 1.93 | 0.988 | 76.6 | 73.4 | 0.958 | 2.136 | 24.0 |
| 122 | — | Mg: 0.256 | Ta: 0.504 | 0 | 0.2 | 0.24 | 0.00 | 0.256 | 0.504 | 1.97 | 0.988 | 76.5 | 73.7 | 0.963 | 2.136 | 24.1 |
| 123 | — | Mg: 0.253 | Ta: 0.507 | 0 | 0.2 | 0.24 | 0.00 | 0.253 | 0.507 | 2.00 | 0.980 | 70.3 | 69.0 | 0.982 | 2.136 | 24.1 |
| 124 | — | Mg: 0.238 | Ta: 0.523 | 0 | 0.2 | 0.24 | 0.00 | 0.238 | 0.523 | 2.20 | 0.975 | 61.5 | 58.8 | 0.956 | 2.136 | 24.1 |
| 125 | — | Mg: 0.224 | Ta: 0.536 | 0 | 0.2 | 0.24 | 0.00 | 0.224 | 0.536 | 2.40 | 0.970 | 31.5 | 28.5 | 0.905 | 2.137 | 24.1 |
| *126 | — | Mg: 0.220 | Ta: 0.540 | 0 | 0.2 | 0.24 | 0.00 | 0.220 | 0.540 | 2.45 | 0.970 | 12.3 | 10.9 | 0.886 | 2.137 | 24.1 |
| 127 | — | Mg: 0.258 | Ta: 0.502 | 0 | 0.24 | 0.24 | 0.00 | 0.258 | 0.502 | 1.95 | 0.985 | 76.2 | 72.9 | 0.957 | 2.135 | 24.1 |
| 128 | — | Mg: 0.258 | Ta: 0.502 | 0 | 0.28 | 0.24 | 0.00 | 0.258 | 0.502 | 1.95 | 0.985 | 76.2 | 73.3 | 0.962 | 2.132 | 24.0 |
| 129 | — | Mg: 0.258 | Ta: 0.502 | 0 | 0.32 | 0.24 | 0.00 | 0.258 | 0.502 | 1.95 | 0.985 | 73.8 | 67.8 | 0.919 | 2.129 | 24.0 |
| 130 | — | Mg: 0.258 | Ta: 0.502 | 0 | 0.36 | 0.24 | 0.00 | 0.258 | 0.502 | 1.95 | 0.985 | 63.5 | 57.3 | 0.902 | 2.127 | 23.9 |
| 131 | — | Mg: 0.258 | Ta: 0.502 | 0 | 0.4 | 0.24 | 0.00 | 0.258 | 0.502 | 1.95 | 0.985 | 41.0 | 39.7 | 0.968 | 2.124 | 23.9 |
| *132 | — | Mg: 0.258 | Ta: 0.502 | 0 | 0.46 | 0.24 | 0.00 | 0.258 | 0.502 | 1.95 | 0.985 | 17.3 | 15.1 | 0.873 | 2.122 | 23.9 |

TABLE 8

| Sample No. | Element represented by M and content | Element represented by B1 and content | Element represented by B2 and content | s | t | x1 | x2 | y | z | z/y | v | Linear transmittance [%] 633 nm | Linear transmittance [%] 450 nm | F value | Refractive index (633 nm) | Abbe number $v_d$ |
|---|---|---|---|---|---|---|---|---|---|---|---|---|---|---|---|---|
| 133 | — | Mg: 0.258 | Ta: 0.502 | 0.4 | 0.2 | 0.24 | 0.00 | 0.258 | 0.502 | 1.95 | 0.990 | 73.8 | 70.5 | 0.955 | 2.102 | 24.2 |
| 134 | — | Mg: 0.258 | Ta: 0.502 | 0.8 | 0.2 | 0.24 | 0.00 | 0.258 | 0.502 | 1.95 | 0.995 | 72.1 | 69.4 | 0.963 | 2.082 | 24.4 |
| 135 | — | Mg: 0.258 | Ta: 0.502 | 0 | 0.2 | 0.08 | 0.00 | 0.312 | 0.608 | 1.95 | 0.985 | 40.5 | 37.7 | 0.931 | 2.117 | 28.1 |
| 136 | — | Mg: 0.285 | Ta: 0.555 | 0 | 0.2 | 0.16 | 0.00 | 0.285 | 0.555 | 1.95 | 0.985 | 77.2 | 74.2 | 0.961 | 2.139 | 24.0 |
| 137 | — | Mg: 0.203 | Ta: 0.397 | 0 | 0.2 | 0.40 | 0.00 | 0.203 | 0.397 | 1.95 | 0.980 | 75.0 | 70.3 | 0.937 | 2.204 | 20.6 |
| 138 | — | Mg: 0.136 | Ta: 0.264 | 0 | 0.2 | 0.60 | 0.00 | 0.136 | 0.264 | 1.95 | 0.975 | 61.3 | 54.5 | 0.889 | 2.258 | 18.1 |
| 139 | — | Mg: 0.034 | Ta: 0.066 | 0 | 0.2 | 0.90 | 0.00 | 0.034 | 0.066 | 1.95 | 0.970 | 25.1 | 22.5 | 0.896 | 2.340 | 15.2 |
| *140 | — | Mg: 0.017 | Ta: 0.033 | 0 | 0.2 | 0.95 | 0.00 | 0.017 | 0.033 | 1.95 | 0.970 | 12.1 | 8.7 | 0.719 | 2.354 | 15.2 |
| 141 | Zr: 0.08 | Mg: 0.258 | Ta: 0.502 | 0 | 0.2 | 0.16 | 0.08 | 0.258 | 0.502 | 1.95 | 0.990 | 76.0 | 73.1 | 0.962 | 2.139 | 24.1 |
| 142 | Zr: 0.16 | Mg: 0.231 | Ta: 0.449 | 0 | 0.2 | 0.16 | 0.16 | 0.231 | 0.449 | 1.95 | 0.990 | 73.1 | 70.8 | 0.969 | 2.139 | 24.0 |
| 143 | Zr: 0.24 | Mg: 0.203 | Ta: 0.397 | 0 | 0.2 | 0.16 | 0.24 | 0.203 | 0.397 | 1.95 | 0.990 | 71.8 | 68.9 | 0.960 | 2.139 | 24.0 |
| 144 | Zr: 0.40 | Mg: 0.149 | Ta: 0.291 | 0 | 0.2 | 0.16 | 0.40 | 0.149 | 0.291 | 1.95 | 0.990 | 68.9 | 65.4 | 0.949 | 2.140 | 23.9 |
| 145 | Zr: 0.60 | Mg: 0.081 | Ta: 0.159 | 0 | 0.2 | 0.16 | 0.60 | 0.081 | 0.159 | 1.95 | 0.990 | 32.3 | 28.7 | 0.889 | 2.140 | 23.9 |
| *146 | Zr: 0.65 | Mg: 0.064 | Ta: 0.126 | 0 | 0.2 | 0.16 | 0.65 | 0.064 | 0.126 | 1.95 | 0.990 | 14.8 | 11.3 | 0.764 | 2.140 | 23.8 |
| 147 | Zr: 0.40 | Mg: 0.034 | Ta: 0.066 | 0 | 0.2 | 0.50 | 0.40 | 0.034 | 0.066 | 1.95 | 0.980 | 24.4 | 22.9 | 0.939 | 2.232 | 19.0 |
| *148 | Zr: 0.45 | Mg: 0.017 | Ta: 0.033 | 0 | 0.2 | 0.50 | 0.45 | 0.017 | 0.033 | 1.95 | 0.980 | 15.7 | 12.7 | 0.809 | 2.232 | 19.0 |
| 149 | Sn: 0.08 | Mg: 0.258 | Ta: 0.502 | 0 | 0.2 | 0.16 | 0.08 | 0.258 | 0.502 | 1.95 | 0.990 | 76.1 | 72.7 | 0.955 | 2.139 | 24.0 |

TABLE 9

| Sample No. | Element represented by M and content | Element represented by B1 and content | Element represented by B2 and content | s | t | x1 | x2 | y | z | z/y | v | Linear transmittance [%] 633 nm | Linear transmittance [%] 450 nm | F value | Refractive index (633 nm) | Abbe number $v_d$ |
|---|---|---|---|---|---|---|---|---|---|---|---|---|---|---|---|---|
| 150 | Hf: 0.08 | Mg: 0.258 | Ta: 0.502 | 0 | 0.2 | 0.16 | 0.08 | 0.258 | 0.502 | 1.95 | 0.990 | 75.5 | 72.6 | 0.962 | 2.139 | 24.0 |
| 151 | Zr: 0.08 Sn: 0.08 | Mg: 0.231 | Ta: 0.449 | 0 | 0.2 | 0.16 | 0.16 | 0.231 | 0.449 | 1.95 | 0.990 | 75.4 | 71.8 | 0.952 | 2.139 | 24.0 |
| 152 | Sn: 0.08 Hf: 0.08 | Mg: 0.231 | Ta: 0.449 | 0 | 0.2 | 0.16 | 0.16 | 0.231 | 0.449 | 1.95 | 0.990 | 74.9 | 70.9 | 0.947 | 2.139 | 24.0 |
| 153 | — | Zn: 0.249 | Ta: 0.511 | 0 | 0.2 | 0.24 | 0.00 | 0.249 | 0.511 | 2.05 | 0.985 | 72.5 | 69.9 | 0.964 | 2.181 | 24.1 |
| 154 | — | Mg: 0.253 | Nb: 0.507 | 0 | 0.2 | 0.24 | 0.00 | 0.253 | 0.507 | 2.00 | 0.995 | 68.5 | 62.8 | 0.917 | 2.186 | 23.9 |
| 155 | — | Zn: 0.253 | Nb: 0.507 | 0 | 0.2 | 0.24 | 0.00 | 0.253 | 0.507 | 2.00 | 0.995 | 66.7 | 60.7 | 0.910 | 2.230 | 23.8 |
| 156 | — | Zn: 0.249 | Ta: 0.511 | 0.8 | 0.2 | 0.24 | 0.00 | 0.249 | 0.511 | 2.05 | 0.985 | 62.7 | 56.5 | 0.901 | 2.130 | 24.5 |
| 157 | — | Mg: 0.253 | Nb: 0.507 | 0.8 | 0.2 | 0.24 | 0.00 | 0.253 | 0.507 | 2.00 | 0.995 | 59.7 | 53.2 | 0.891 | 2.132 | 24.2 |
| 158 | — | Mg: 0.253 | Nb: 0.507 | 0.8 | 0.2 | 0.24 | 0.00 | 0.253 | 0.507 | 2.00 | 0.995 | 57.4 | 50.4 | 0.878 | 2.180 | 24.2 |
| *159 | — | Y: 0.376 | Ta: 0.384 | 0 | 0.2 | 0.24 | 0.00 | 0.384 | 0.376 | 0.98 | 0.990 | 17.5 | 13.0 | 0.743 | 2.122 | 24.5 |
| 160 | — | Y: 0.376 | Ta: 0.384 | 0 | 0.2 | 0.24 | 0.00 | 0.380 | 0.380 | 1.00 | 0.990 | 32.1 | 28.8 | 0.897 | 2.122 | 24.5 |
| 161 | — | Y: 0.376 | Ta: 0.384 | 0 | 0.2 | 0.24 | 0.00 | 0.376 | 0.384 | 1.02 | 0.990 | 70.1 | 64.5 | 0.920 | 2.122 | 24.5 |

TABLE 9-continued

| Sample No. | Element represented by M and content | Element represented by B1 and content | Element represented by B2 and content | s | t | x1 | x2 | y | z | z/y | v | Linear transmittance [%] 633 nm | Linear transmittance [%] 450 nm | F value | Refractive index (633 nm) | Abbe number $v_d$ |
|---|---|---|---|---|---|---|---|---|---|---|---|---|---|---|---|---|
| 162 | — | In: 0.376 | Ta: 0.384 | 0 | 0.2 | 0.24 | 0.00 | 0.376 | 0.384 | 1.02 | 0.990 | 63.5 | 58.1 | 0.915 | 2.153 | 24.8 |
| 163 | — | Y: 0.376 | Nb: 0.384 | 0 | 0.2 | 0.24 | 0.00 | 0.376 | 0.384 | 1.02 | 0.990 | 66.7 | 60.9 | 0.913 | 2.170 | 24.3 |

TABLE 10

| Sample No. | Element represented by M and content | Element represented by B1 and content | Element represented by B2 and content | s | t | x1 | x2 | y | z | z/y | v | Linear transmittance [%] 633 nm | Linear transmittance [%] 450 nm | F value | Refractive index (633 nm) | Abbe number $v_d$ |
|---|---|---|---|---|---|---|---|---|---|---|---|---|---|---|---|---|
| 164 | — | In: 0.376 | Nb: 0.384 | 0 | 0.2 | 0.24 | 0.00 | 0.376 | 0.384 | 1.02 | 0.990 | 60.4 | 55.0 | 0.911 | 2.201 | 24.4 |
| 165 | — | Y: 0.376 | Ta: 0.384 | 0.8 | 0.2 | 0.24 | 0.00 | 0.376 | 0.384 | 1.02 | 0.990 | 62.2 | 57.7 | 0.928 | 2.074 | 25.1 |
| 166 | — | In: 0.376 | Ta: 0.384 | 0.8 | 0.2 | 0.24 | 0.00 | 0.376 | 0.384 | 1.02 | 0.990 | 60.1 | 55.2 | 0.918 | 2.105 | 25.4 |
| 167 | — | Y: 0.376 | Nb: 0.384 | 0.8 | 0.2 | 0.24 | 0.00 | 0.376 | 0.384 | 1.02 | 0.990 | 59.7 | 54.5 | 0.913 | 2.122 | 24.8 |
| 168 | — | In: 0.376 | Nb: 0.384 | 0.8 | 0.2 | 0.24 | 0.00 | 0.376 | 0.384 | 1.02 | 0.990 | 57.1 | 52.1 | 0.912 | 2.152 | 25.0 |
| 169 | — | Mg: 0.126 Zn: 0.127 | Ta: 0.507 | 0 | 0.2 | 0.24 | 0.00 | 0.253 | 0.507 | 2.00 | 0.990 | 75.1 | 72.1 | 0.960 | 2.159 | 24.1 |
| 170 | — | Mg: 0.126 Zn: 0.127 | Nb: 0.507 | 0 | 0.2 | 0.24 | 0.00 | 0.253 | 0.507 | 2.00 | 0.995 | 68.4 | 62.4 | 0.912 | 2.208 | 23.9 |
| 171 | — | Mg: 0.253 | Ta: 0.254 Nb: 0.253 | 0 | 0.2 | 0.24 | 0.00 | 0.253 | 0.507 | 2.00 | 0.990 | 70.8 | 65.5 | 0.925 | 2.161 | 23.9 |
| 172 | — | Y: 0.376 | Ta: 0.192 Nb: 0.192 | 0 | 0.2 | 0.24 | 0.00 | 0.376 | 0.384 | 1.02 | 0.990 | 68.3 | 63.2 | 0.925 | 2.146 | 24.4 |
| 173 | — | Mg: 0.129 Y: 0.188 | Ta: 0.443 | 0 | 0.2 | 0.24 | 0.00 | 0.317 | 0.443 | 1.40 | 0.990 | 71.8 | 67.3 | 0.937 | 2.129 | 24.3 |
| 174 | — | Zn: 0.129 Y: 0.188 | Ta: 0.443 | 0 | 0.2 | 0.24 | 0.00 | 0.317 | 0443 | 1.40 | 0.990 | 72.3 | 67.5 | 0.934 | 2.152 | 24.3 |

Regarding the expression in each of columns "Element represented by M and content", "Element represented by B1 and content", and "Element represented by B2 and content" in Table 6 to Table 10, in the case where one element is represented by M, B1 or B2, the content of the element is equal to the value of x2, y or z. In the case where at least two elements are represented by M, B1 or B2, the total content of the elements is equal to the value of x2, y or z.

The above-described calcined powder was put into a ball mill together with water and an organic binder, and wet-pulverization was conducted for 16 hours. Ethyl cellulose was used as the organic binder.

The above-described pulverized material was dried and, thereafter, put through a 50-mesh screen (sieve) so as to granulate it. The resulting powder was press-molded by being pressed at a pressure of 196 MPa, so that an unfired disk-shaped ceramic compact having a diameter of 30 mm and a thickness of 2 mm was produced.

The above-described unfired ceramic compact was embedded in a powder having the same composition as that of the raw material ceramic powder contained in the ceramic compact. The resulting compact embedded in the powder was put into a firing furnace, and was heated in an air atmosphere, so that a binder removal treatment was conducted. Oxygen was fed into the furnace while the temperature was raised continuously and, thereby, the oxygen concentration in the firing atmosphere was increased to about 98 percent by volume in a maximum temperature range of 1,600° C. to 1,700° C. An optimum maximum temperature was selected appropriately on the basis of the material composition, and the maximum temperature was 1,625° C. for Sample 114. The compact was fired for 20 hours while this firing temperature and the oxygen concentration were maintained, so as to produce a sintered body. The total pressure during the firing was set at 1 atmosphere.

The thus produced sintered body was mirror-finished, and shaped into a disk having a thickness of 0.4 mm, so that a translucent ceramic sample was produced.

With respect to each of the above-described Samples, the linear transmittance was measured in a visible light region, specifically at each of wavelengths λ of 633 nm and 450 nm. A spectrophotometer (UV-2500) produced by SHIMADZU CORPORATION was used for measuring these linear transmittances, as in Experimental example 1.

Furthermore, the F value, that is, the ratio of the linear transmittance for the visible light with a wavelength of 450 nm to the linear transmittance for the visible light with a wavelength λ of 633 nm, was calculated from the linear transmittance at each of the above-described wavelengths λ of 633 nm and 450 nm.

With respect to each of the above-described Samples, the refractive index at a wavelength λ of 633 nm was measured. A prism coupler (Model 2010) produced by Metricon was used for measuring the refractive index.

Furthermore, refractive indices at wavelengths λ of 405 nm, 532 nm and 830 nm were also measured with the prism coupler. The values of refractive indices at these four wavelengths (405 nm, 532 nm, 633 nm and 830 nm) were used, and constants a, b, and c were calculated on the basis of Formula 1 that is an expression representing the relationship between the wavelength and the refractive index, so that the relationship between the wavelength and the refractive index was specified.

$$n = a/\lambda^4 + b/\lambda^2 + c \qquad \text{Formula 1:}$$

(In Formula 1, n represents refractive index, λ represents wavelength, and a, b, and c independently represent a constant.)

The refractive indices at three wavelengths (F line: 486.13 nm, d line: 587.56 nm, and C line: 656.27 nm), which are required for calculating the Abbe number ($v_d$), were determined on the basis of Formula 1, and the Abbe number was calculated on the basis of Formula 2 that is an expression defining the Abbe number.

$$v_d = (n_d - 1)/(n_F - n_c) \qquad \text{Formula 2:}$$

(In Formula 2, $n_d$, $n_F$, and $n_c$ represent refractive indices for the d line, the F line and the C line, respectively.)

The linear transmittance, the F value, the refractive index and the Abbe number determined as described above are shown in Table 6 to Table 10.

In Table 6 to Table 10, asterisked sample numbers indicate samples which are out of the scope of the present invention.

As is clear from Table 6 to Table 10, Samples 103 to 105, 107 to 118, 120 to 125, 127 to 131, 133 to 139, 141 to 145, 147, 149 to 158, and 160 to 174, which were within the scope of the present invention, satisfied each of the conditions of $0 \leq s \leq 0.92$, $0.08 \leq t \leq 0.40$, $x1+x2+y+z=1$, $0 < x1+x2 \leq 0.9$, $0 \leq x2 \leq 0.6$, $1.00 \leq z/y \leq 2.40$, and $0.97 \leq v \leq 1.04$. Consequently, the linear transmittances were 20% or more, and the F values were 0.85 or more. In addition, the refractive indices were large and were 2.01 or more. The range of change in refractive index was large and was from 2.074 (Sample 165) to 2.340 (Sample 139). The range of change in Abbe number was large and was from 15.2 (Sample 139) to 28.1 (Sample 135).

It is clear from comparisons among, for example, Samples 135 to 139, that as the Ti content x1 increases, the refractive index increases and the Abbe number decreases.

On the other hand, Samples 126 and 159, which were out of the scope of the present invention because values of z/y were out of the range of 1.00 to 2.40, exhibited poor sinterability. Consequently, the linear transmittances were less than 20%.

Samples 106 and 119, which were out of the scope of the present invention because values of v were out of the range of 0.97 to 1.04, exhibited poor sinterability, as in the above-described case. Consequently, the linear transmittances were less than 20%.

Samples 140 and 148 were out of the scope of the present invention because values of x1+x2 exceeded 0.9, and therefore, the linear transmittances were less than 20%.

Samples 146 was out of the scope of the present invention because the value of x2 exceeded 0.6, and therefore, the linear transmittance was less than 20%.

Comparisons were made between Samples 101 and 102, which were out of the scope of the present invention and, for example, Sample 103, which was within the scope of the present invention. Every one of them exhibited a value of X1 of 0.24 and thus contained Ti. On the other hand, comparisons are made on the Ca content t. Sample 1 exhibited the value of t of 0, that is, Ca was not contained. Consequently, the F value was less than 0.9. As the Ca content t increased to 0.04 and 0.08, as in Samples 102 and 103, the F value of Sample 103 exhibiting the value of t of 0.08 became 0.85 or more, whereas the F value of Sample 102 exhibiting the value of t of 0.04 did not increase. As is clear from this, the Ca content t must be 0.08 or more to improve the F value.

EXPERIMENTAL EXAMPLE 4

Figure 8:
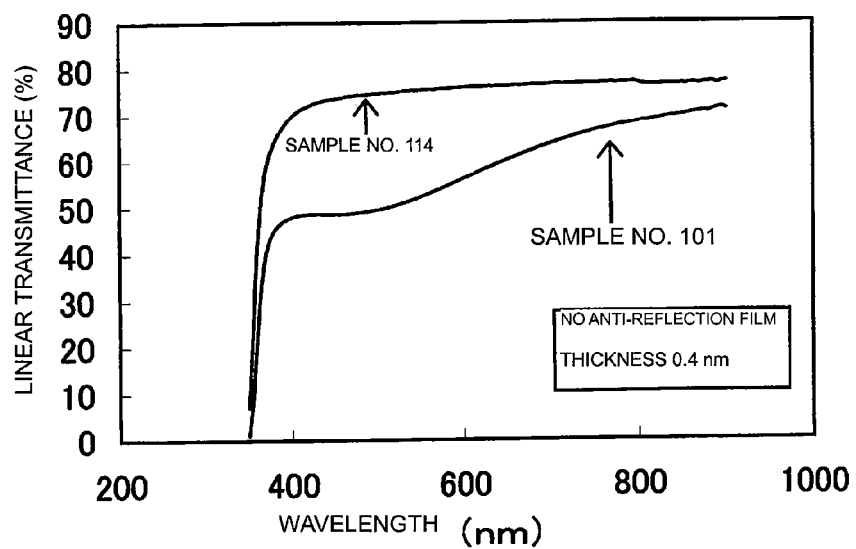
FIG. 8 is a diagram showing the linear transmittances of Sample 101 as a comparative example and Sample 114 as an example in a wavelength range of visible light, the linear transmittance being measured in Experimental example 4.

With respect to Sample 101 and Sample 114 shown in Table 6, the linear transmittances in a wavelength range of visible light (350 to 900 nm) were measured. FIG. 8 shows the measurement results.

Sample 101 is a comparative example, and as described above, the value of t is 0. That is, the composition does not contain Ca. On the other hand, Sample 114 is an example of the present invention, the value of t is 0.2, and Ca is contained. As is clear from FIG. 8, the transmittance of Sample 101 is lower than that of Sample 114 over the entire range of the measurement wavelength and, in addition, large absorption is observed in a wavelength range of 400 to 700 nm, in particular, in the vicinity of 450 nm. On the other hand, it is clear that Sample 114 exhibits a nearly flat transmittance at 400 nm or more. This indicates that the sintered body becomes colorless and the wavelength dependence of the transmittance is small. That is, it is indicated that the F value is close to 1.

EXPERIMENTAL EXAMPLE 5

Subsequently, the refractive index of Sample 114 was also measured at λ=587.562 nm (d line) in TE mode and TM mode. The values were 2.1369 in both modes and, therefore, it was made clear that no birefringence occurred.

As shown in Table 6, the linear transmittance of Sample 114 at λ=633 nm was 76.2%, and the refractive index (λ=633 nm) was 2.127. In general, light is incident perpendicularly to a sample from the air in the measurement of the linear transmittance. Therefore, the light is reflected at the front side and the back side (that is, an interface between the sample and the air) of the sample. In the case where the refractive index is 2.127, the theoretical maximum value of the linear transmittance becomes 77.0%, which is determined by subtracting the reflection at the front side and the back side of the sample. For Sample 114, the linear transmittance is 76.2% and, therefore, the relative transmittance with reference to the theoretical value is 99.0%. It is indicated that there is almost no transmission loss in the inside of the sintered body. Consequently, formation of an anti-reflection film on the surface of Sample 114 allows the resulting linear transmittance to become nearly the theoretical value. In this manner, the translucent ceramic according to an aspect of the present invention has excellent properties useful for an optical element.

EXPERIMENTAL EXAMPLE 6

Cast molding was applied to the composition of Sample 114 exhibiting a high linear transmittance, among Samples shown in Table 6 to Table 10, so that an unfired ceramic compact 2 inches (50.8 mm) square was prepared. The resulting unfired ceramic compact was fired at 1,625° C. so as to produce a sintered body. Sample 114a prepared through the cast molding was prepared in a manner similar to that in the case where Sample 114 was obtained in the above-described Experimental example 3 except that the molding method was changed from the press molding to the cast molding.

The linear transmittance of Sample 114a prepared through cast molding, as described above, was evaluated by the same evaluation method as that in Experimental example 3. The results thereof are shown in Table 11. The linear transmittances of Sample 114 obtained through press molding in Experimental example 3 are also shown in Table 11.

TABLE 11

| Sample No. | Molding method | Linear transmittance [%] 633 nm | 450 nm |
|---|---|---|---|
| 114 | press molding | 76.2 | 73.7 |
| 114a | cast molding | 76.6 | 73.9 |

As is clear from Table 11, the values of the linear transmittance in the case of press molding and the linear transmittance in the case of cast molding are equal or substantially equal to each other. Consequently, it is clear that the translucent ceramic according to an aspect of the present invention exhibits excellent optical properties regardless of molding method.

EXPERIMENTAL EXAMPLE 7

The firing temperature of the composition of Sample 114 was changed to 1,700° C. and a sintered body for Sample 114b was prepared. The same condition as that in the case of Sample 114 prepared in Experimental example 3 was applied to the preparation of Sample 114b except that the firing temperature was changed.

The linear transmittance of Sample 114b prepared by changing the firing temperature was measured by the same evaluation method as that in Experimental example 3. The measurement results are shown in Table 12. The linear transmittances of Sample 114 (firing temperature: 1,625° C.) obtained in the above-described Experimental example 3 are also shown in Table 12.

TABLE 12

| Sample No. | Firing temperature | Linear transmittance [%] 633 nm | 450 nm |
|---|---|---|---|
| 114 | 1625° C. | 76.2 | 73.7 |
| 114b | 1700° C. | 76.5 | 73.8 |

As is clear from Table 12, the values of the linear transmittances are equal or substantially equal to each other even when the firing temperature is changed. Consequently, it is clear that the translucent ceramic according to an aspect of the present invention may be produced while the firing temperature is changed.

The present invention has been specifically described with reference to Experimental examples. However, the form of carrying out the present invention is not limited to the forms in the above-described Experimental examples. For example, the form of the raw material is not limited to the oxide or the carbonate, and any form may be adopted insofar as the material can exhibit desired properties in a state of being converted to a sintered body. With respect to the firing atmosphere, the value of the oxygen concentration of about 98 percent by volume in the above-described Experimental example was most preferable under the condition of the experimental equipment put in the use. However, the oxygen concentration is not limited to about 98 percent by volume. It is known that a sintered body having desired properties can be obtained by ensuring the oxygen concentration of 90 percent by volume or more.

The invention claimed is:

1. A translucent ceramic comprising a perovskite compound having a composition represented by the general formula $(Ba_{1-s-t}Sr_sCa_t)(Ti_{x1}M_{x2}B1_yB2_z)_vO_w$ in which M is at least one of Sn, Zr and Hf, B1 is at least one of Mg, Zn, Y and In, B2 is at least one of Ta and Nb, $0 \leq s \leq 0.92$, $0.01 \leq t \leq 0.40$, $0 \leq x1$; $x1+x2+y+z=1$, $0<x1+x2 \leq 0.9$, $0 \leq x2 \leq 0.6$, $1.00 \leq z/y \leq 2.40$, and $0.97 \leq v \leq 1.04$, and w is a positive number for maintaining electrical neutrality.

2. The translucent ceramic according to claim 1, in which X1 is 0, and x2 is greater than 0.

3. The translucent ceramic according to claim 2, having a linear transmittance for visible light with a wavelength of 633 nm of 60% or more at a thickness of 0.4 mm.

4. The translucent ceramic according to claim 3, in which the ceramic is polycrystalline.

5. The translucent ceramic according to claim 1, in which $0.08 \leq t \leq 0.40$ and $0<x1$.

6. The translucent ceramic according to claim 5, wherein the linear transmittance for visible light with a wavelength of 633 nm is 20% or more at a sample thickness of 0.4 mm.

7. The translucent ceramic according to claim 6, wherein the ratio of the linear transmittance for visible light with a wavelength of 450 nm at a sample thickness of 0.4 mm to the linear transmittance for visible light with a wavelength of 633 nm at a sample thickness of 0.4 mm basis is 0.85 or more.

8. The translucent ceramic according to claim 7, which is polycrystalline.

9. The translucent ceramic according to claim 1, in which M comprises Zr, B1 comprises Mg, and B2 comprises Ta.

10. The translucent ceramic according to claim 1, having an antireflective film on a surface thereof.

11. The translucent ceramic according to claim 1, having an antireflective film on a surface thereof.

12. An optical component comprising the translucent ceramic according to claim 1.

13. An optical device comprising the optical component according to claim 12.

14. An optical component comprising the translucent ceramic according to claim 2.

15. An optical device comprising the optical component according to claim 14.

16. An optical component comprising the translucent ceramic according to claim 5.

17. An optical device comprising the optical component according to claim 16.

18. An optical component comprising the translucent ceramic according to claim 10.

19. A method for manufacturing the translucent ceramic according to claim 1, comprising:
   providing an unfired, molded ceramic compact of raw material ceramic powder;
   providing a co-firing composition having substantially the same composition as that of the raw material ceramic powder; and
   firing the unfired ceramic compact in an atmosphere having an oxygen concentration of 90 percent by volume or more while the co-firing composition is in contact with the unfired ceramic compact.

20. The method for manufacturing the translucent ceramic according to claim 19, wherein the co-firing composition is a powder and the firing step is conducted while the unfired ceramic compact is embedded in the powder of the co-firing composition.

* * * * *